Aug. 6, 1940.  M. D. ROSS  2,210,686
SECTIONALIZED HYDROGEN-COOLED MACHINE
Filed Dec. 17, 1937  2 Sheets-Sheet 1

WITNESSES:
E. F. Oberheim.
F. P. Lyle

INVENTOR
Malcolm D. Ross.
BY O. D. Buchanan
ATTORNEY

Aug. 6, 1940.  M. D. ROSS  2,210,686

SECTIONALIZED HYDROGEN-COOLED MACHINE

Filed Dec. 17, 1937  2 Sheets-Sheet 2

WITNESSES:
E. F. Oberheim
F. P. Lyle

INVENTOR
Malcolm D. Ross.
BY O. B. Buchanan
ATTORNEY

Patented Aug. 6, 1940

2,210,686

UNITED STATES PATENT OFFICE 2,210,686

SECTIONALIZED HYDROGEN-COOLED MACHINE

Malcolm D. Ross, Wilkinsburg, Pa., assignor to Westinghouse Electric & Manufacturing Company, East Pittsburgh, Pa., a corporation of Pennsylvania Application December 17, 1937, Serial No. 180,407

5 Claims. (Cl. 171—252)

The present invention relates to the construction of large hydrogen cooled or other totally enclosed dynamo-electric machines, and it relates more specifically, to the gas-tight housings of such machines.

When hydrogen cooling is used for machines such as synchronous generators, it is necessary to enclose the entire machine in a gas-tight shell or housing to prevent escape of the hydrogen. This, of course, greatly increases the overall size of the unit, and when the machine itself is of large size, the addition of the gas-tight housing may make it too big to be shipped as a complete unit. It is necessary, therefore, in such cases to provide a construction which will permit shipment of the machine in sections and the assembly of the housing with the stator core and other elements in the location where it is to be permanently placed.

The object of the present invention is to provide a construction for a hydrogen cooled machine which will allow it to be shipped in sections and assembled and made gas-tight in the field.

A further object is to provide a construction which will facilitate the insertion of the stator core into the housing after the latter is assembled and will make it possible to secure the stator rigidly to the housing in the field.

These objects are attained by dividing the housing into sections which can be bolted together or otherwise joined and made gas-tight, after which the stator core can be inserted axially into the housing and secured to it by a plurality of longitudinal keys or by welding.

The invention will be more fully understood from the following description taken in connection with the accompanying drawings, in which.

Figure 1:
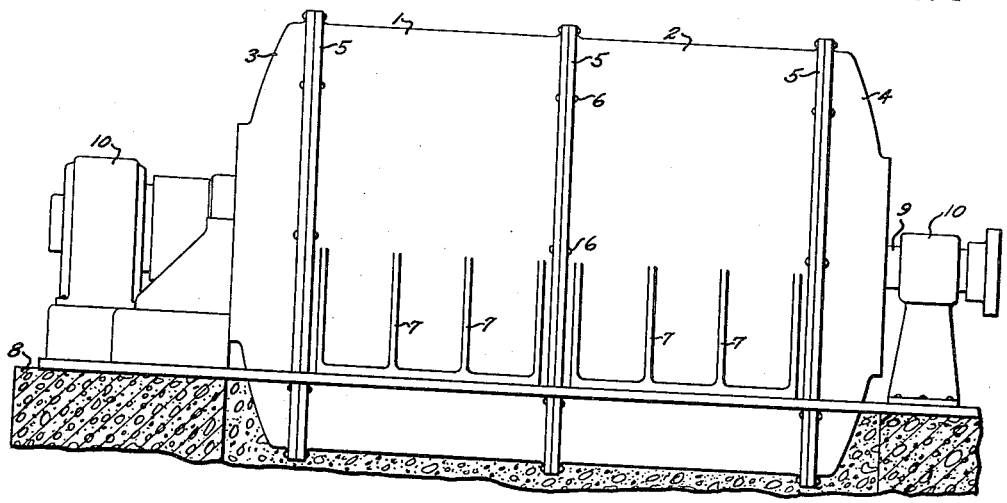
Figure 1 is a side elevation of an assembled machine.

Referring to the drawings, Figure 1 shows a completely assembled unit in which the gas-tight housing is made up of two cylindrical sections 1 and 2 and end members 3 and 4. It will be understood, of course, that more than two sections may be used if the size of the machine makes it necessary. These sections are provided with flanges 5 and are adapted to be connected together by bolts 6 using gaskets or other suitable means to form gas-tight joints. The sections 1 and 2 are provided with the customary supporting members 7 to support the machine on its base 8. The rotor shaft is indicated at 9 and is mounted for rotation in suitable bearings 10. A rotor member 11 of any suitable construction is keyed or otherwise secured to the shaft 9.

A plurality of circumferential flanges or web members 12 are secured to the interior of the housing sections 1 and 2 and openings 13 are provided in these flanges to permit free circulation of hydrogen or other cooling medium. A plurality of longitudinal members or ribs 14 are supported on the flanges 12 and corresponding ribs in adjacent sections of the housing are connected together by bolts 15 or other suitable means.

The stator member is adapted for insertion axially into the housing after the sections 1 and 2 have been joined together and tested for gas leaks and consists of a stator core 16 of any desired construction having windings 17 placed in slots therein. A plurality of circumferential flanges 18 corresponding in position to the flanges 12 encircle the stator core and are secured to it, and longitudinal ribs 19 corresponding in number and position to the ribs 14 are supported on the flanges 18.

Figure 3:
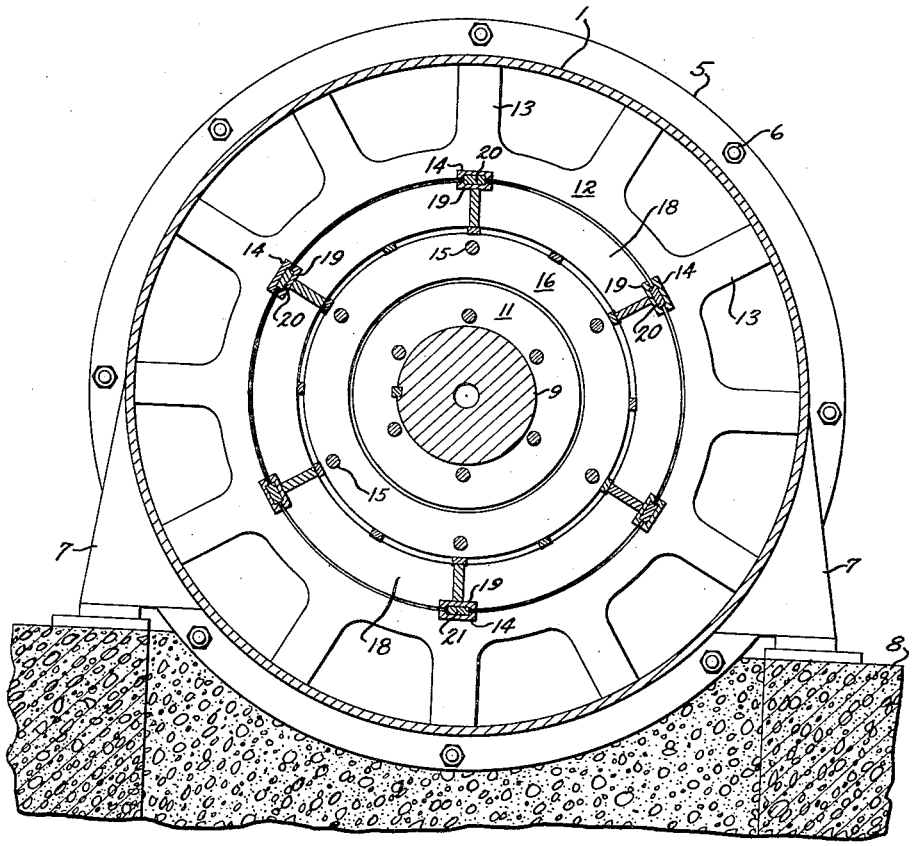
Fig. 3 is a transverse section of the machine showing an alternative construction.

In the construction shown in Fig. 3, the ribs 14 and 19 are formed with keyways extending their entire length, and after insertion of the stator member into the housing, keys 20 are inserted into these keyways, thus securing the stator member in the housing and holding it rigidly against torque stresses. The lowermost key 21 is hardened and is placed in the housing member before assembly. Prior to insertion of the stator, this key is lubricated with any suitable lubricant, such as grease, and serves as a bearing member during insertion of the stator to support its weight and act as a guide and thus facilitate its insertion into the housing.

Figure 2:
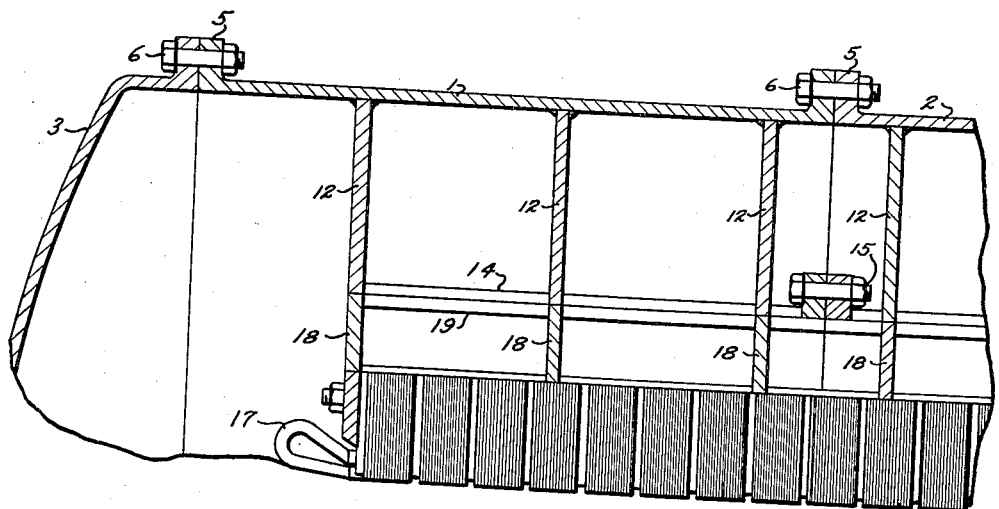
Fig. 2 is a fragmentary longitudinal section of the same machine on a larger scale.

As shown in Fig. 2, as an alternative method, the keys 20 may be omitted and the stator member and housing secured together by welding along the joints between the ribs 14 and 19. When this is done, the ribs are formed without keyways except in the case of the lowermost ribs in which a single hardened key corresponding to the key 21 is provided to serve as a bearing member during insertion of the stator, as described above.

Figure 4:
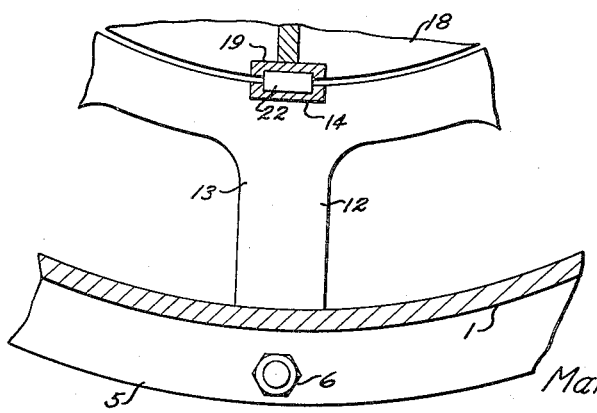
Fig. 4 is a fragmentary detail view corresponding to the lower part of Fig. 3 and showing another alternative construction.

Fig. 4 shows another alternative construction in which the hardened key 21 is replaced by a plurality of rollers 22 mounted in the lowermost longitudinal member 14 of the housing. These rollers act as bearing members to support the weight of the stator member during insertion in the same manner as the key 21, and may be used with either of the methods of securing the stator member to the housing described above.

The machine may be shipped in sections as described and is assembled in the field by joining the cylindrical housing sections 1 and 2 together with a gas-tight joint by using gaskets or other suitable means. After testing for gas leaks, the stator member is inserted axially into the housing, using the bearing member 21 or rollers 22 to support its weight and facilitate the insertion, and it is then secured to the housing either by using longitudinal keys 20 or by welding as described above. The rotor and end members may then be put in place and the machine filled with hydrogen or other cooling medium in the usual manner.

It will be seen, therefore, that a very simple construction has been provided which makes it possible to sectionalize hydrogen cooled machines which are too large for shipment as a unit, so that they can be shipped in sections and easily assembled and made gas-tight in the field. It will also be apparent that this construction is not limited to hydrogen cooled machines but may be applied to any totally enclosed machine when the size of the machine and its housing is too great to permit shipment as a completely assembled unit.

Although a specific embodiment of the invention has been illustrated and described, it is to be understood that it is not limited to this construction, but, in its broadest aspect, it includes all equivalent embodiments which fall within the scope of the appended claims.

I claim as my invention:

1. A gas-cooled dynamo-electric machine comprising a plurality of generally cylindrical sections secured together to form a gas-tight housing, a stator member adapted to be inserted axially into the housing and secured thereto, and a plurality of rollers in the lower part of the housing for suporting the stator member during insertion.

2. A gas-cooled dynamo-electric machine comprising a plurality of generally cylindrical sections secured together to form a gas-tight housing, a stator member adapted to be inserted axially into the housing and a plurality of longitudinal keys between the housing and stator member to secure them together, the lowermost of said keys being hardened and lubricated to serve as a bearing member during insertion of the stator member.

3. A totally enclosed dynamo-electric machine having a gas-tight housing which comprises a plurality of generally cylindrical sections, a plurality of longitudinal ribs on the interior of the housing, a stator member in the housing, a plurality of longitudinal ribs secured to the outside of the stator member and corresponding in number and position to the ribs on the housing, each of said ribs having a keyway formed in it, and keys fitting in said keyways to secure the stator member and housing rigidly together.

4. A totally enclosed dynamo-electric machine having a gas-tight housing which comprises a plurality of generally cylindrical sections, a plurality of longitudinal ribs on the interior of the housing, a stator member in the housing, a plurality of longitudinal ribs secured to the outside of the stator member and corresponding in number and position to the ribs on the housing, means for securing said two sets of ribs rigidly together, and a bearing member mounted in the lowermost rib of the housing to support the stator member during its insertion into the housing.

5. A totally enclosed dynamo-electric machine comprising a stator member, a rotor member, and a housing completely enclosing the machine, said housing consisting of a plurality of generally cylindrical sections joined together to form a gas-tight enclosure and having a plurality of longitudinal ribs on the interior thereof, said stator member being a separate, unitary assembly including a stator core and a supporting structure for the core having a plurality of longitudinal ribs, the ribs on the housing and the ribs on the stator member corresponding in number and position and being adapted to be rigidly secured together, and bearing means mounted in the lowermost rib in the housing for supporting and guiding the stator member to permit it to be inserted axially into the housing.

MALCOLM D. ROSS.